Nov. 21, 1950   A. T. BRIGGS   2,531,319
ENGINE LUBRICATING APPARATUS
Filed Jan. 19, 1945
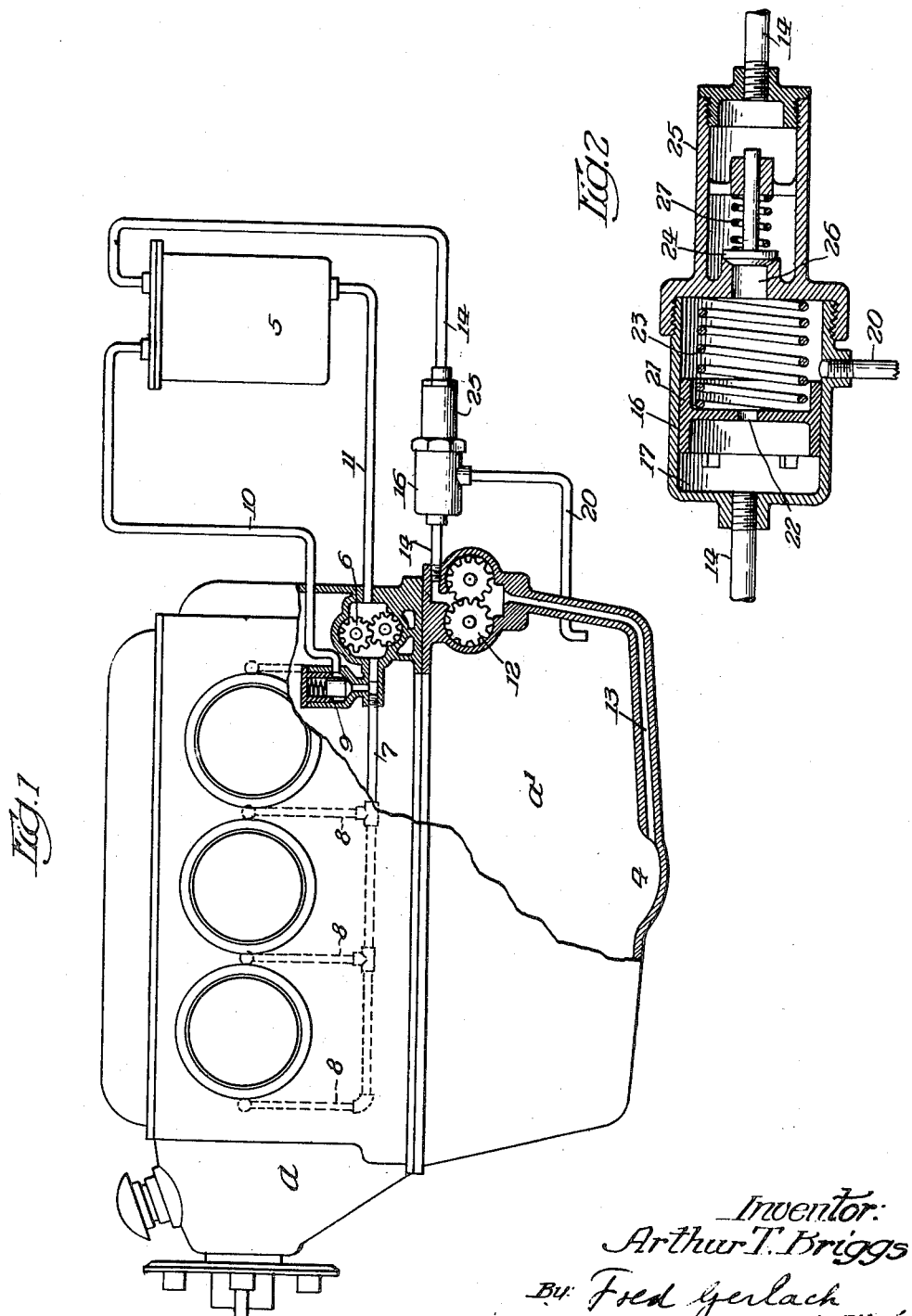
Inventor:
Arthur T. Briggs
By Fred Gerlach
his Atty

UNITED STATES PATENT OFFICE 2,531,319

ENGINE LUBRICATING APPARATUS

Arthur T. Briggs, Williamsport, Pa., assignor to AVCO Manufacturing Corporation, a corporation of Delaware Application January 19, 1945, Serial No. 573,521

6 Claims. (Cl. 184—6)

The invention relates to lubricating systems for internal combustion engines.

One object of the invention is to provide a pressure lubricating system for internal combustion engines which includes a scavenging pump for returning oil from the usual sump in the crank case, in which oil from the lubricating parts is collected, to the pressure system, with means for automatically by-passing air or oil-vapor from the scavenging pump to the sump when the sump becomes dry or nearly so, as frequently occurs in engines used on aircraft.

Another object of the invention is to provide a simple and efficient device for by-passing air or oil vapor from the scavenging pump to the sump, so that the air or vapor will not be delivered to the oil delivered under pressure to the parts to be lubricated.

Another object of the invention is to provide a pressure lubricating system for engines, which includes simple and efficient valve-means which facilitates the priming of the scavenging pump and prevents the back-flow of oil from the distributing system to the crank case.

Other objects of the invention will appear from the detail description.

The invention consists of the several novel features hereinafter set forth and more particularly defined by claims at the conclusion hereof.

In the drawings:

Fig. 1 is a diagrammatical view of the engine equipped with the invention.

Fig. 2 is a longitudinal section of the automatic device for controlling the flow of oil from the scavenging pump to the pressure lubricating system and the flow of air or vapor to the sump.

The engine is exemplified with an internal combustion engine of the opposed cylinder type, which comprises a crank case $a-1$ in which an oil sump 4 is provided. The oil distributing system for lubrication comprises a reservoir 5 from which an engine-driven gear-pump 6 draws oil through a pipe 11 and forces the oil under pressure to a pipe 7 with branch pipes 8 which are connected to deliver oil to the parts of the engine to be lubricated, as well understood in the art. Pump 6 has a sufficient capacity to force oil at a pressure required for proper lubrication of the parts at all engine speeds, such as occur when the engine is used in aircraft. This predetermined pressure of oil is maintained in the oil distributing pipes 7 and 8 by a spring-loaded re-life valve 9, which is connected by a pipe 10 to discharge the excess oil into reservoir 5.

An engine-driven scavenging gear-pump 12 has its inlet communicatively connected by a duct 13 with the sump 4. The pump 12 has more than sufficient capacity to draw all of the oil from the sump and to force the oil through a duct or pipe 14 into the closed reservoir 5. During the operation of the engine, pumps 6 and 12 are continuously driven, as well understood in the art. The sump 4 sometimes becomes dry, or nearly so, as the result of the tilting of the engine, its excess capacity or from other causes, and when this occurs air or vapor will be drawn from the sump through duct 13 by the pump 12. It is important to prevent this air or vapor from being pumped into reservoir 5 from which it may be forced by the pump 6 to the lubricating lines. It is also important to reduce the discharge pressure of the pump 12 during the time vapor or gas is being pumped so that when liquid again collects in the sump 4 the pump will prime itself and resume scavenging the return oil from the sump.

For these purposes a device is included in pipe 14 between scavenging pump 12 and reservoir 5 for by-passing air and vapor from said pump to the crank case thereby lowering the discharge pressure of pump 12 during the period that little or no liquid is being pumped and, also, for preventing back-flow of oil from the section of pipe 14 connected to the reservoir, to the by-pass. This device comprises a casing-section 16, one end of which is communicatively connected by a section of pipe 14 to the outlet of scavenging pump 12 and a casing section 25 which is connected by another section of pipe 14 to the reservoir 5; a cylinder 17 in the casing section 16; a by-pass pipe or duct 20 which is communicatively connected to cylinder 17 and is adapted to by-pass air or vapor from cylinder 17 to the crank case; a piston 21, which functions as valve means, is slidable in cylinder 17, has one of its sides exposed to the pressure of fluid in cylinder 17, is adapted to open and close the by-pass 20 and is provided with a port 22 through which fluid can flow from the end portion of the cylinder on one side of the piston to its other side; a spring 23 of a predetermined characteristic for urging the valve-piston 21 into position to open the by-pass 20 against the pressure of air or vapor in cylinder 17 and which permits the pressure of liquid oil acting against one side of the valve piston to close the by-pass; and a check valve 24 which has a stem slidably mounted in casing-section 25 is adapted to close a port 26 communicating with the discharge end of cylinder 17 and is normally pressed into closed position by a spring 27 for preventing back-flow of oil from the section of the pipe 14 between casing section 25 and the reservoir 5.

The area of port or orifice 22 is so chosen relative to the liquid flow capacity of the pump 12 and force exerted by the spring 23, that when substantially solely liquid oil is being pumped the piston 21 is urged against the force of spring 23 into a position to close the by-pass 20. Preferably the force exerted by the spring 23 is small being only sufficient to move the piston 21 against friction and the area of port 22 is preferably as great as possible and yet maintain enough pressure drop across the port 22 to cause piston 21 to close by-pass 20 at substantially normal liquid flow capacity of pump 12. The relationship of the spring 23 to the area of port 22 and area of piston 21 should also be such that when air or gas which is less dense than liquid, is being pumped by the positive displacement type pump 12 the air or gas pumped by pump 12 will not provide enough pressure drop across port 22 to hold the piston 21 against the force of spring 23 in a position to close the by-pass 20 with the result that when substantially only air or vapor is being pumped the by-pass 20 will be open and the discharge pressure of pump 12 will be greatly lower than the pressure in line 14 beyond the check valve 24. This difference in head or discharge pressure of pump 12 will of course be greater at greater altitudes because the head of oil in reservoir 5 and that portion of conduit 14 intermediate check valve 24 and reservoir 5 is constant while the absolute pressure in sump 4 decreases.

The operation will be as follows: In normal operation when oil is present in sump 4, scavenging pump 12 will force oil from the sump into one end of cylinder 17. Sufficient oil pressure will be exerted against the side of valve piston 21 facing the inlet end of cylinder 17 due to the pressure drop across port 22 to shift valve-piston 21 into position to hold said piston in position to close by-pass 20 against the force of spring 23. Oil will be forced through port 22 in the valve-piston 21 with sufficient velocity to provide the required pressure differential for moving piston 21 to close by-pass 20. With by-pass 20 closed the pressure in the chamber 17 will at once rise causing check valve 24 to open for flow through port 26 and conduit 14 to reservoir 5. This condition will be maintained as long as the sump contains sufficient oil to supply the pump 12. When the sump becomes dry or nearly dry, air or an air-oil mixture of high air percentage, or vapor, will be drawn by pump 12 from the sump. The air or vapor will be forced into the inlet end of cylinder 17 by pump 12. Owing to the lesser density of the air or vapor than the oil, the air or vapor will not exert sufficient pressure drop across orifice 22 to hold the piston 21 against the force of spring 23 for closing by-pass 20. The air or vapor will flow through port 22 in valve-piston 21 and duct 20 to the crank case. Check valve 24 will be closed by spring 27 to retain the head of oil in the line between casing section 25 and reservoir 5, so that the oil will not flow from reservoir 5 to the by-pass 20. As soon as oil is again present in the sump 4, pump 12 will draw liquid oil from the sump and force it into cylinder 17 to shift valve-piston 21 against the force of spring 23 and close the by-pass 20 and oil will be again pumped to the reservoir 5. While valve piston 21 is positioned to open by-pass 20, the by-pass will permit air or vapor on the pressure side of the pump to flow freely back to the crank case, which will accelerate the priming of the pump and the removal of the residual air or vapor in duct 13.

The invention exemplifies simple, efficient and automatic means for by-passing air or vapor from the scavenging pump to the crank case when the sump is dry, thereby preventing the air or vapor from being forced to the oil distributing system; and also provides for the priming of the pump.

The invention is not to be understood as restricted to the details set forth, since these may be modified within the scope of the appended claims without departing from the spirit and scope of the invention.

Having thus described the invention, what I claim is new and desire to secure by Letters Patent is:

1. The combination with a lubricating system for engines which comprises means for distributing oil under pressure to the parts to be lubricated, a sump which receives oil from the distributing means, and a scavenging pump connected to draw fluid from the sump; of a valve including a casing connected to receive fluid discharged by the pump and to return oil to the distributing system, and a piston; a by-pass between the casing and the sump controlled by the piston, the piston being operable by the pressure of liquid from the pump for shifting it to close the by-pass and having a restricted port for the flow of fluid therethrough, and a spring for shifting the piston to open the by-pass and of such force that it will permit the piston to be shifted by the pressure of liquid from the pump and will shift the piston to open the by-pass when air or vapor is delivered by the pump.

2. The combination with a lubricating system for engines which comprises means for distributing oil under pressure to the parts to be lubricated, a sump which receives oil from the distributing means, and a scavenging pump connected to draw fluid from the sump; of a valve including a cylindrical casing having one of its ends connected to receive fluid discharged by the pump, and its other end to return oil to the distributing system, and a piston slidable in the casing; a by-pass between the casing and the sump, the piston having sufficient area so it is operable by the liquid under pressure from the pump, for shifting it to close the by-pass, and being provided with a port for the flow of fluid therethrough, a spring for shifting the piston to open the by-pass and of such force that it will permit the piston to be shifted by the pressure of liquid from the pump and will shift the piston to open the by-pass when air or vapor is delivered to the casing by the pump, and a check-valve in the casing for preventing back flow of oil from the system to the by-pass.

3. In combination with a sump for collecting liquids and vapors and a pump for scavenging the sump and returning collected liquids to a storage reservoir, a fluid control device for separating the liquid to be returned to the reservoir from the mixture of liquids and gases delivered by the pump, said fluid control device comprising a casing formed to define a cylindrical chamber therein having an inlet port at one end thereof in communication with the pump and an outlet port at the other end thereof for the discharge of liquids to the reservoir, by-pass means communicating with the chamber intermediate its ends for conveying gaseous fluids back to the sump, a piston slidably retained within the cylindrical chamber for movement thereby to open and close said by-pass means, said piston being formed to define a restriction through which fluids flowing to the outlet port and by-pass means are constrained to pass thereby establishing a pressure differential across said piston, and a spring associated with said piston and casing, said spring being proportioned to permit movement of said piston to close said by-pass means when the pressure differential is above a predetermined value and to open said by-pass means when the pressure differential is below a predetermined value.

4. Apparatus as defined in claim 3 and, in addition, check valve means associated with the outlet port to prevent backflow of liquid to the chamber from the reservoir.

5. A fluid control device for separating gaseous fluids and liquids delivered thereto by a pumping means and for discharging the separated liquids and gases to independent receptacles, said fluid control device comprising a casing formed to define a cylindrical chamber therein having an inlet port at one end thereof in communication with the pump and an outlet port at the other end thereof for discharge of liquids to a receptacle, by-pass means communicating with the chamber intermediate its ends for conveying gaseous fluids to a second receptacle, a piston slidably retained within the cylindrical chamber for movement thereby to open and close said by-pass means, said piston being formed to define a restriction through which fluids flowing to the outlet port and by-pass means are constrained to pass thereby establishing a pressure differential across said piston, and a spring associated with said piston and casing, said spring being proportioned to permit movement of said piston to close said by-pass means when the pressure differential is above a predetermined value and to open said by-pass means when the pressure differential is below a predetermined value.

6. A fluid control device for separating liquids and vapors comprising a casing formed to define a chamber having an inlet port near one end through which liquids and vapors are supplied to the chamber and having near the opposite end an outlet port through which liquids may be discharged, by-pass means communicating with the chamber intermediate the inlet and outlet ports to convey vapors from the chamber, a piston slideably retained within the said chamber intermediate its ends for movement thereby to open and close said by-pass means, a passageway interconnecting the ends of said chamber defined by said piston through which fluids flowing to the outlet port and by-pass means are constrained to pass thereby establishing a pressure differential across said piston, and a spring associated with said piston and casing, said spring being proportioned to permit movement of said piston to close said by-pass means when the pressure differential is above a predetermined value and to open said by-pass means when the pressure differential is below a predetermined value.

ARTHUR T. BRIGGS.

REFERENCES CITED

The following references are of record in the file of this patent:

UNITED STATES PATENTS

| Number | Name | Date |
|---|---|---|
| 2,024,336 | Cavanaugh | Dec. 17, 1935 |

FOREIGN PATENTS

| Number | Country | Date |
|---|---|---|
| 128,170 | Austria | May 10, 1932 |